US012761358B2

(12) United States Patent
Chen et al.

(10) Patent No.: US 12,761,358 B2
(45) Date of Patent: Oct. 13, 2026

(54) LENS, STRUCTURED LIGHT PROJECTION DEVICE AND 3D MEASUREMENT DEVICE

(71) Applicant: WEO IP Pte Ltd, Singapore (SG)

(72) Inventors: Yi-Chin Chen, Hsinchu City (TW); Chuan-Te Cheng, Hsinchu City (TW)

(73) Assignee: WEO IP Pte Ltd, Singapore (SG)

( * ) Notice: Subject to any disclaimer, the term of this patent is extended or adjusted under 35 U.S.C. 154(b) by 1029 days.

(21) Appl. No.: 17/969,733

(22) Filed: Oct. 20, 2022

(65) Prior Publication Data

US 2023/0204775 A1 Jun. 29, 2023

Related U.S. Application Data

(60) Provisional application No. 63/294,825, filed on Dec. 29, 2021.

(30) Foreign Application Priority Data

Jul. 6, 2022 (TW) ................................ 111125425

(51) Int. Cl.
*G01S 17/89* (2020.01)
*G02B 13/16* (2006.01)
*G02B 27/00* (2006.01)

(52) U.S. Cl.
CPC .............. *G01S 17/89* (2013.01); *G02B 13/16* (2013.01); *G02B 27/0068* (2013.01)

(58) Field of Classification Search
CPC ...... G01S 17/89; B02B 13/16; B02B 27/0068
See application file for complete search history.

(56) References Cited

U.S. PATENT DOCUMENTS

| | | | | |
|---|---|---|---|---|
| 8,836,922 | B1 * | 9/2014 | Pennecot | G01S 17/42 356/9 |
| 10,012,723 | B2 * | 7/2018 | Lindskog | G01S 7/4813 |
| 10,175,497 | B2 * | 1/2019 | Ishida | G03B 21/2033 |
| 10,185,026 | B2 * | 1/2019 | Kumagai | G01S 7/4812 |
| 10,473,921 | B2 * | 11/2019 | Smits | G01S 17/87 |
| 10,877,153 | B2 * | 12/2020 | Barbier | G01S 17/10 |
| 10,983,196 | B2 * | 4/2021 | Ohtomo | G01C 15/006 |
| 11,112,492 | B2 * | 9/2021 | Utermoehlen | G01D 5/2053 |
| 11,402,506 | B2 * | 8/2022 | Ohtomo | G01S 17/08 |
| 2007/0273847 | A1 * | 11/2007 | Minami | G02B 27/0068 353/101 |
| 2012/0212841 | A1 * | 8/2012 | Wang | G02B 13/16 359/784 |

* cited by examiner

*Primary Examiner* — Marisa V Conlon

(57) ABSTRACT

A lens including a first lens group, second lens group, and third lens group arranged sequentially from a magnified side to a reduced side is provided. The first lens group has a first optical axis, the second lens group has a second optical axis, the third lens group has a third optical axis, and the third optical axis is overlapped with a primary optical axis of the lens. The first lens group and the second lens group are adapted to be rotated in opposite directions so that the first optical axis and the second optical axis are adapted to incline relative to the primary optical axis. The first lens group is also adapted to shift towards a first side and a second side of the primary optical axis. A structured light projection device with the lens and a 3D measurement device with the lens are also provided.

20 Claims, 10 Drawing Sheets

LENS, STRUCTURED LIGHT PROJECTION DEVICE AND 3D MEASUREMENT DEVICE

CROSS-REFERENCE TO RELATED APPLICATIONS

This application claims the benefit of U.S. Provisional Application No. 63/294,825, filed on Dec. 29, 2021, which is hereby incorporated by reference for all purposes as if fully set forth herein.

FIELD OF THE INVENTION

The present invention relates to an optical element, and more particularly, to a lens, a structured light projection device, and a 3D measuring device that has the lens.

BACKGROUND OF THE INVENTION

At present, most 3D measurements are based on non-contact measurements of optical theories, and mainly based on the structured light imaging. A structured light imaging-based 3D measuring device includes a structured light projection device and image sensor element. Since the structured light projection device projects the structured beam onto the target object, and the image sensor collects reflection beam signals reflected from the surface of the target object, the surface profile of the target object can be calculated according to the change of the reflected light signal on the surface of the target object, thereby constructing a complete 3D graphics.

However, when the structured beam is projected onto the inclined target object, a keystone effect is created. In addition, when the image sensor element captures the image of the oblique object, the acquired image has a significant field curvature effect, resulting in the blurring of local areas. These phenomena can lead to the inaccuracy of 3D measurements.

SUMMARY OF THE INVENTION

The present invention provides a kind of lens to solve the issue of image distortion.

The present invention further provides a structured light projection device, to reduce the problem of the keystone effect generated in projected images.

The present invention further provides a 3D measuring device, to acquire clear images, thereby raising the accuracy of 3D measurement.

To achieve at least one of the above advantages, an embodiment of the present invention provides a lens that comprises a first lens group, a second lens group, and a third lens group arranged sequentially from an enlargement side to a reduction side. The first lens group has a first optical axis, the second lens group has a second optical axis, the third lens group has a third optical axis, and the third optical axis overlaps with a primary optical axis of the lens. The first lens group and the second lens group are rotated in opposite directions so that the first optical axis and the second optical axis are adapted to be inclined relative to the primary optical axis. The first lens group is adapted to move towards the first side and a second side of the primary optical axis.

According to an embodiment of the present invention, diopters of the first lens group, the second lens group, and the third lens group are all positive.

According to an embodiment of the present invention, the first optical axis and the second optical axis incline relative to the primary optical axis, and the lens satisfies the following equation:

$$0.85<|\theta 3/(\theta 1-\theta 2)|<2.72;$$

where θ1 denotes an angle between the first optical axis and the primary optical axis, θ2 denotes an angle between the second optical axis and the primary optical axis, and θ3 denotes the angle between the primary optical axis and a normal vector of a target surface located on the enlargement side.

According to an embodiment of the present invention, the lens further comprises an aperture stop located in the second lens group, and the primary optical axis passes through the aperture stop.

According to an embodiment of the present invention, the aperture stop is located on a side of the second lens group adjacent to the third lens group.

According to an embodiment of the present invention, the first lens group comprises a first lens, a second lens, a third lens, a fourth lens, and a fifth lens arranged sequentially from an enlargement side to the reduction side, with respective diopters being positive, positive, negative, positive, and negative. The second lens group comprises a sixth lens and a seventh lens arranged sequentially from an enlargement side to the reduction side, with respective diopters being positive and negative. The third lens group comprises an eighth lens, a ninth lens, a tenth lens, an eleventh lens, a twelfth lens, and a thirteenth lens arranged sequentially from an enlargement side to the reduction side, with respective diopters being negative, positive, negative, positive, positive, and positive.

To achieve at least one of the above advantages, an embodiment of the present invention further provides a structured light projection device that comprises a structured light illumination system and the above-mentioned lens. The structured light illumination system comprises a light source and a light valve. The light source is adapted to provide an illumination beam, and the light valve is adapted to convert the illumination beam into a structured beam. The light valve is located on the reduction side of the lens. The lens is adapted to project the structured beam onto a target surface located on the enlargement side of the lens. The primary optical axis of the lens is overlapped with the normal vector at the center of the active surface of the light valve.

According to an embodiment of the present invention, the structured light projection device further comprises an optical low-pass filter arranged between the light valve and the third lens group.

To achieve at least one of the above advantages, an embodiment of the present invention further provides a 3D measuring device that comprises a structured light illumination system, a beam-splitter, an image sensor, and the above-mentioned lens. The structured light illumination system comprises a light source and a light valve, wherein the light source is adapted to provide an illumination beam, and the light valve is adapted to convert the illumination beam into a structured beam. The light valve is located on the reduction side of the lens, the lens is adapted to project the structured beam onto a target surface of the enlargement side located on the lens. The primary optical axis of the lens is overlapped with the normal vector at the center of the active surface of the light valve. The beam-splitter is arranged between the light valve and the third lens group, wherein the structured beam so that the structured beam is transmitted to the lens via the beam-splitter. The image sensor is arranged adjacent to the beam-splitter, wherein after a reflected beam reflected from the target surface passes through the lens, the reflection beam is provided to the image sensor via the beam-splitter.

According to an embodiment of the present invention, the 3D measuring device further comprises an optical low-pass filter arranged between the light valve and the beam-splitter.

Regarding the lens of the present invention embodiment, since the first lens group and the second lens group are adapted to rotate in opposite directions and the first lens group is also adapted to move, the problem of image distortion can be improved by moving and rotating. The structured light projection device of the present invention uses the above-mentioned lens, and thus it can eliminate the problem of keystone distortion in projected images. Further, the 3D measuring device of the present invention uses the above-mentioned lens, and thus it can improve the problem of keystone distortion in the projected images and the field curvature phenomenon in the sensed images, thereby improving the accuracy of 3D measurement.

To make the above-mentioned lens and other objects, features, and advantages of the present invention more obvious and easier to understand, embodiments are given as follows to describe in more detail with the accompanying drawings.

DETAILED DESCRIPTION OF PREFERRED EMBODIMENTS

Figure 1:
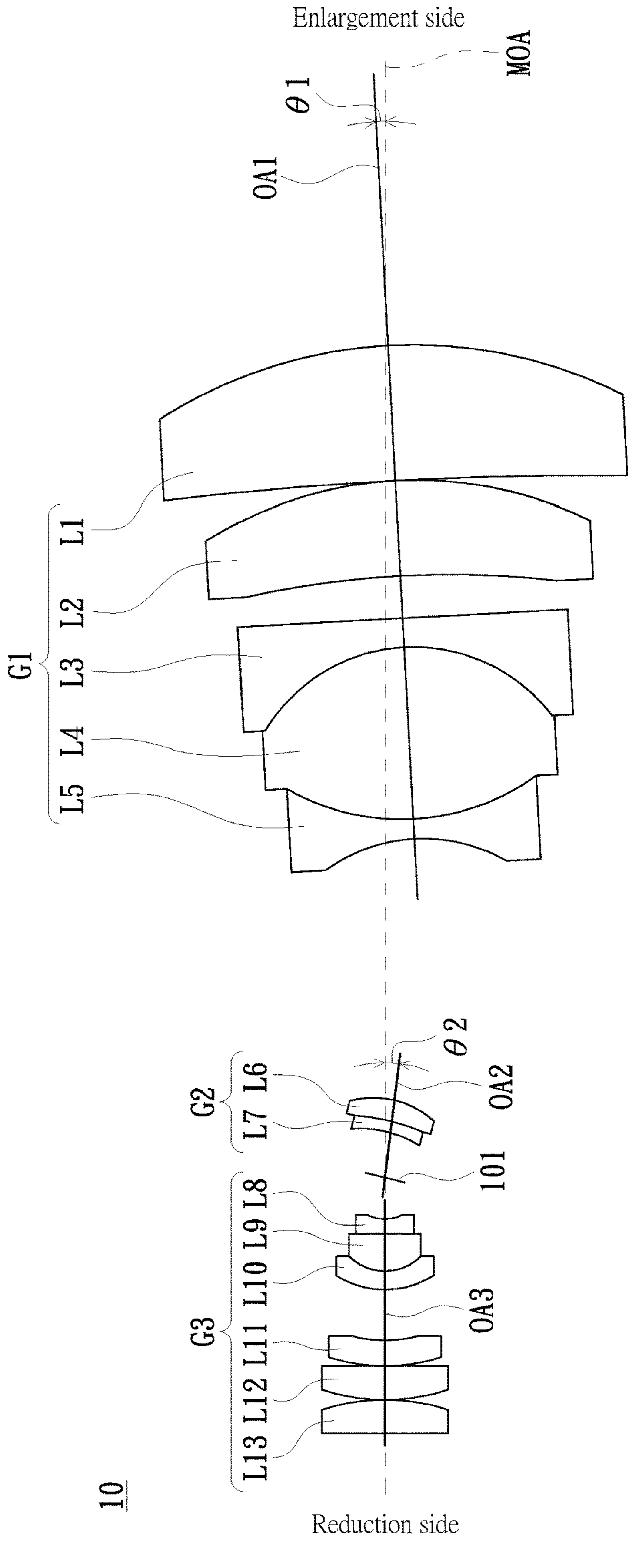
FIG. 1 is a diagram illustrating a lens according to an embodiment of the present invention.

FIG. 1 is a diagram illustrating a lens according to an embodiment of the present invention. Referring to FIG. 1, the lens 10 in this embodiment comprises a first lens group G1, a second lens group G2 and a third lens group G3 arranged sequentially from the enlargement side to the reduction side. The first lens group G1 has a first optical axis OA1, the second lens group G2 has a second optical axis OA2, and the third lens group G3 has a third optical axis OA3. The third optical axis OA3 is overlapped with the primary optical axis MOA of the lens. The first lens group G1 and second lens group G2 are adapted to rotate in opposite directions so that the first optical axis OA1 and the second optical axis OA2 are adapted to incline relative to the primary optical axis MOA. Specifically, FIG. 1 shows that the first lens group G1 rotates counterclockwise and the second lens group G2 rotates clockwise. In FIG. 1, the inclined angle of the first optical axis OA1 is defined as a negative value, and the inclined angle of the second optical axis OA2 is defined as a positive value. Conversely, when the inclined angle of the first optical axis OA1 is a positive value, the inclined angle of the second optical axis OA2 is a negative value.

In this embodiment, the first lens group G1 is also adapted to move towards the first side and the second side of the primary optical axis MOA. The first side and the second side refer to opposite sides relative to the primary optical axis MOA, e.g., the upper and lower sides of the primary optical axis MOA in FIG. 1. In addition, when the first lens group G1 and the second lens group G2 are not rotated and the first lens group G1 is not moved, the first optical axis OA1 and the second optical axis OA2 are also overlapped with the primary optical axis MOA.

In this embodiment, the lens 10 may be a bi-telecentric lens. For example, the diopters of the first lens group G1, the second lens group G2 and the third lens group G3 may be all positive. In addition, the first lens group G1, for example, may comprise a first lens L1, second lens L2, third lens L3, fourth lens L4, and fifth lens L5 arranged sequentially from the enlargement side to the reduction side, with respective diopters being positive, positive, negative, positive, and negative. The second lens group G2 may comprise a sixth lens L6 and seventh lens L7 arranged sequentially from the enlargement side to the reduction side, with respective diopters being positive and negative. The third lens group G3 may comprise an eighth lens L8, ninth lens L9, tenth lens L10, eleventh lens L11, twelfth lens L12, and thirteenth lens L13 arranged sequentially from the enlargement side to the reduction side, with respective diopters being negative, positive, negative, positive, positive, and positive.

The above-mentioned the lens 10 may have an aperture stop 101 located on the second lens group G2, and the primary optical axis MOA passes through the aperture stop 101. The primary optical axis MOA passes through the aperture stop 101 regardless of whether the second optical axis OA2 is tilted relative to the primary optical axis MOA. In this embodiment, the aperture stop 101 may be located on the side of the second lens group G2 adjacent to the third lens group G3, i.e., located between the seventh lens L7 and the eighth lens L8.

In the lens 10 of this embodiment, the first lens group G1 and the second lens group G2 are adapted to rotate in opposite directions, and the first lens group G1 is adapted to move. By adjusting the rotation angles of the first lens group G1 and the second lens group G2 and the moved distance of the first lens group G1, the problems of keystone distortion and field curvature can be improved, and the effects of low telecentricity and low TV distortion can be achieved. Therefore, the lens 10 of this embodiment can improve the problem of image distortion, which facilitates providing high-quality projected images and obtaining clear side —images when applied to 3D measurement.

In an embodiment, when the first optical axis OA1 and second optical axis OA2 incline relative to the primary optical axis MOA, the lens 10 satisfies the following equation:

$$0.85<|\theta 3/(\theta 1-\theta 2)|<2.72; \qquad (1)$$

where θ1 denotes the angle between the first optical axis OA1 and the primary optical axis MOA, θ2 denotes the angle between the second optical axis OA2 and the primary optical axis MOA, and θ3 denotes the angle between the primary optical axis MOA and the normal vector of the target surface located on the enlargement side.

When the lens 10 satisfies the above Equation (1), the volume of the first lens group G1 and/or the second lens group G2 can be reduced, so the lens 10 has the advantage of a smaller volume. Moreover, the images projected through the lens 10 will not have the problem of blurring which makes the keystone distortion unable to be corrected.

Table 1 lists each parameter of the lens 10 according to an embodiment of the present invention. It should be noted that the data listed in Table 1 is not intended to limit the scope of the present invention, any skilled in the art may apply appropriate changes to the parameters or settings after referring to the present invention, and those changes shall fall within the claimed scope of the present invention.

TABLE 1

| Element | Surface | Radius (mm) | Thickness (mm) | Refractive index (Nd) | Abbe number (Vd) |
|---|---|---|---|---|---|
| First lens L1 | 1 | −65.79 | 11.79 | 1.81 | 25.48 |
| | 2 | −874.56 | 0.10 | | |
| Second lens L2 | 3 | −44.88 | 10.15 | 1.65 | 58.42 |
| | 4 | −106.15 | 2.26 | | |
| Third lens L3 | 5 | Infinity | 3.50 | 1.81 | 25.48 |
| Fourth lens L4 | 6 | −19.49 | 15.43 | 1.59 | 68.34 |
| Fifth lens L5 | 7 | 38.28 | 2.20 | 1.65 | 33.84 |
| | 8 | −21.54 | 35.63 | | |
| Sixth lens L6 | 9 | −10.89 | 2.27 | 1.88 | 40.81 |
| Seventh lens L7 | 10 | −38.39 | 1.10 | 1.60 | 38.01 |
| | 11 | −13.16 | 5.09 | | |
| Aperture stop 101 | 12 | | 5.05 | | |
| Eighth lens L8 | 13 | 6.93 | 1.20 | 1.52 | 64.17 |
| Ninth lens L9 | 14 | −11.60 | 4.91 | 1.49 | 70.24 |
| Tenth lens L10 | 15 | 6.40 | 1.20 | 1.76 | 27.51 |
| | 16 | 14.88 | 3.00 | | |
| Eleventh lens L11 | 17 | 38.62 | 3.13 | 1.49 | 70.24 |
| | 18 | 19.44 | 0.10 | | |
| Twelfth lens L12 | 19 | 138.38 | 3.69 | 1.59 | 68.34 |
| | 20 | 21.76 | 0.10 | | |
| Thirteenth lens L13 | 21 | −30.22 | 3.48 | 1.62 | 63.33 |
| | 22 | −1930.49 | | | |

The "thickness" indicated in Table 1 refers to the linear distance between two adjacent surfaces on the primary optical axis MOA of the lens 10. For example, the thickness of Surface 1 means the linear distance between Surface 1 and Surface 2 on the primary optical axis MOA. A surface with a positive radius of curvature means the surface is curved towards the enlargement side. A surface with a negative radius of curvature means the surface is curved towards the reduction side. The radius of curvature is infinite, which means that the surface is neither curved towards the enlargement side nor the reduction side.

Figure 2:
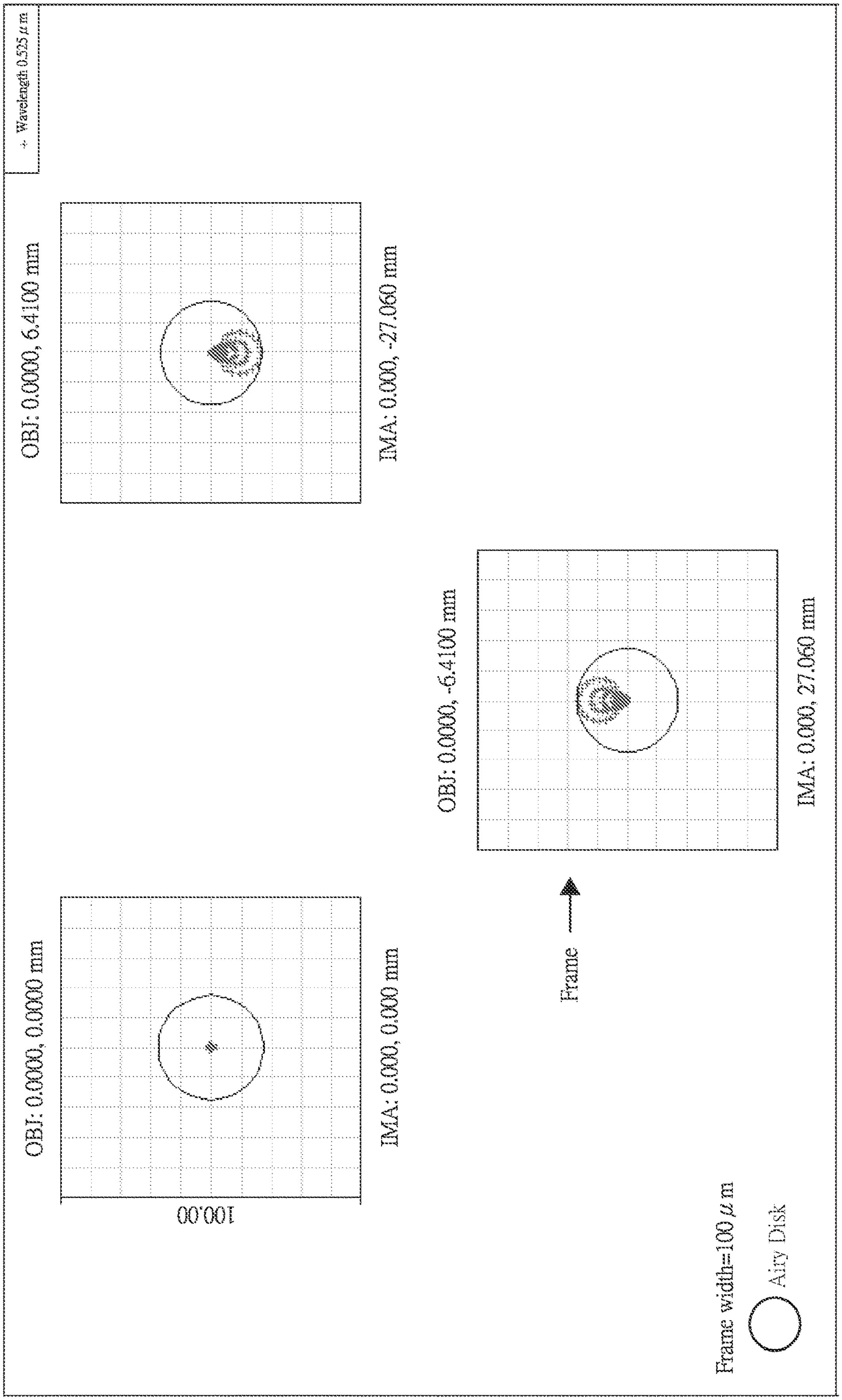
FIGS. 2-4 are schematic diagrams of the spot size under different usage states.
Figure 3:
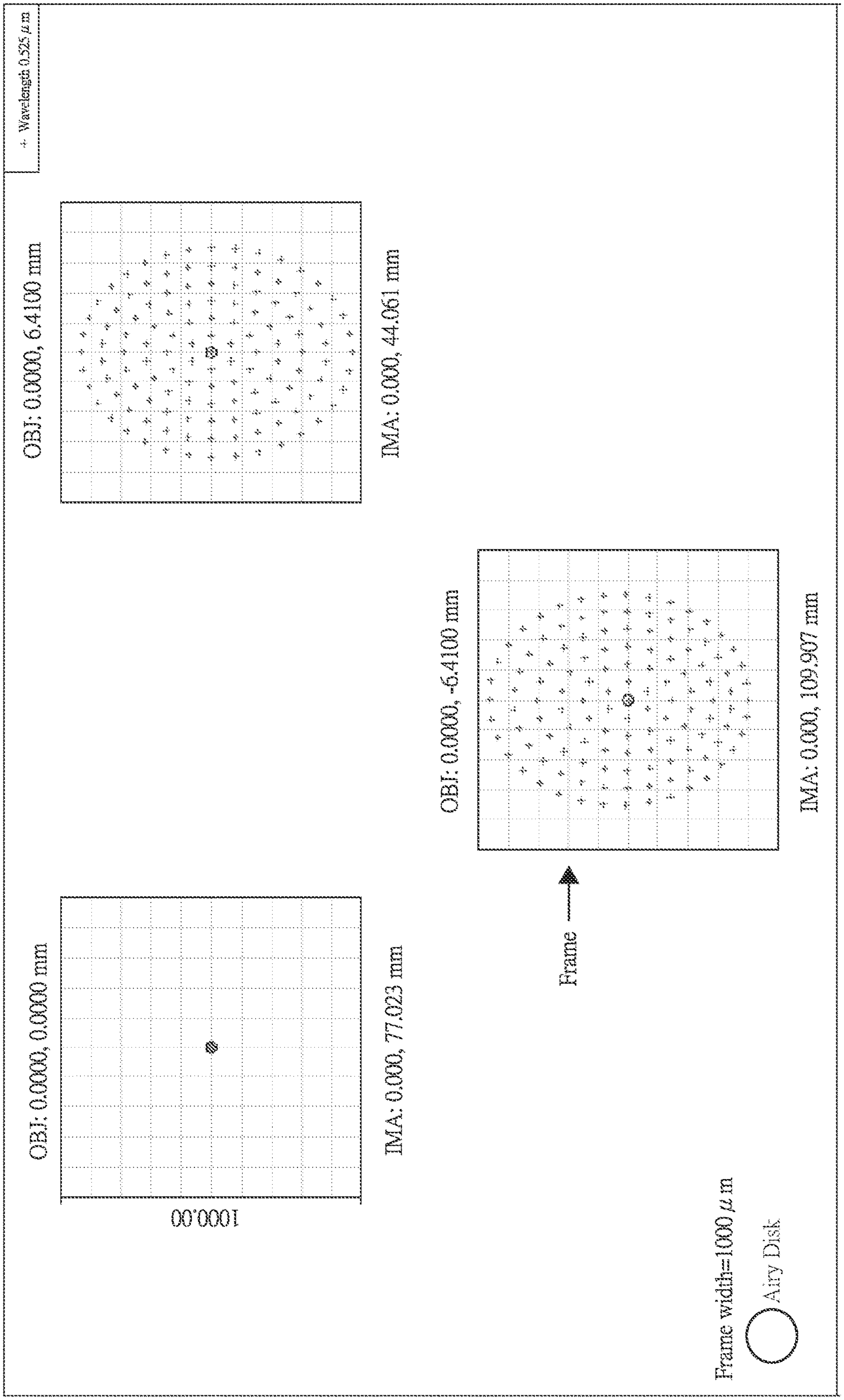
Figure 4:
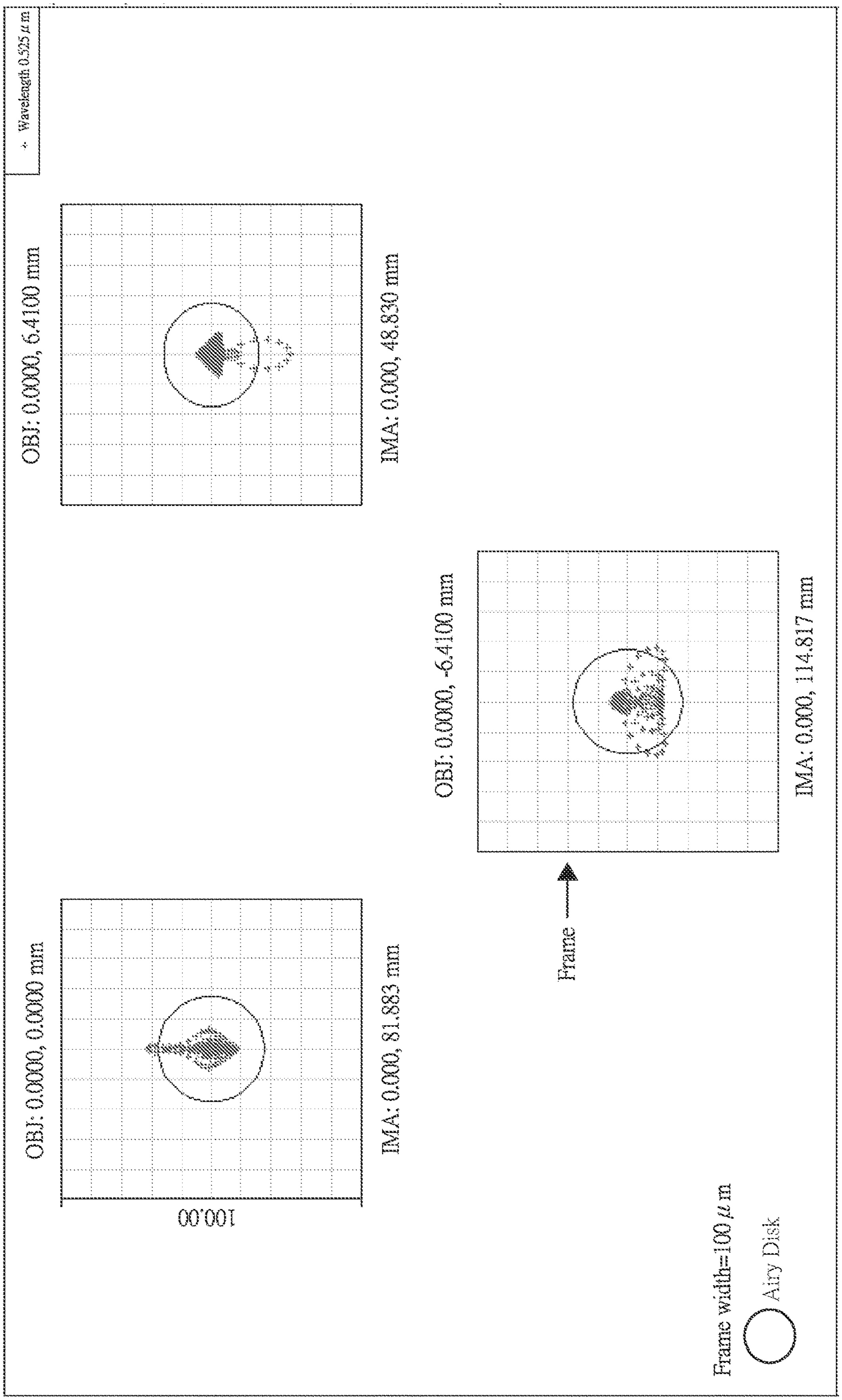

FIG. 2 to FIG. 4 are the facula sizes of the lens of FIG. 1 under different usage states. Specifically, the state of FIG. 2 is that the first optical axis OA1, second optical axis OA2, and third optical axis OA3 in FIG. 1 are all overlapped with the primary optical axis MOA, and the primary optical axis MOA is perpendicular to the imaging plane located on the enlargement side. The state of FIG. 3 is that the first optical axis OA1, second optical axis OA2, and third optical axis OA3 in FIG. 1 are all overlapped with the primary optical axis MOA, and the angle between the primary optical axis MOA and the normal of the imaging plane is 35 degrees. The state of FIG. 4 is that the first optical axis OA1 and the second optical axis OA2 of FIG. 1 are inclined relative to the primary optical axis MOA, and the angle between the primary optical axis MOA and the normal of the imaging plane is 35 degrees. In FIG. 2 to FIG. 4, OBJ denotes the object surface located on the reduction side, and IMA denotes the image surface (i.e., target surface) located on the enlargement side. As shown in FIG. 2, when the primary optical axis MOA is perpendicular to the imaging plane, the first optical axis OA1 and the second optical axis OA2 can have good imaging quality without tilting. As shown in FIG. 3, when the primary optical axis MOA is relatively inclined to the normal of the imaging plane, and the first optical axis OA1 and the second optical axis OA2 are still not inclined, the imaging quality will be thus affected. As shown in FIG. 4, when the primary optical axis MOA is inclined relative to the normal of the imaging plane, and the first optical axis OA1 and the second optical axis OA2 are tilted relative to the primary optical axis MOA, the imaging quality can be thus improved. Note that the size of circles located on the bottom left corner of FIGS. 2-4 are used to represent the size of the airy disk.

Figure 5:
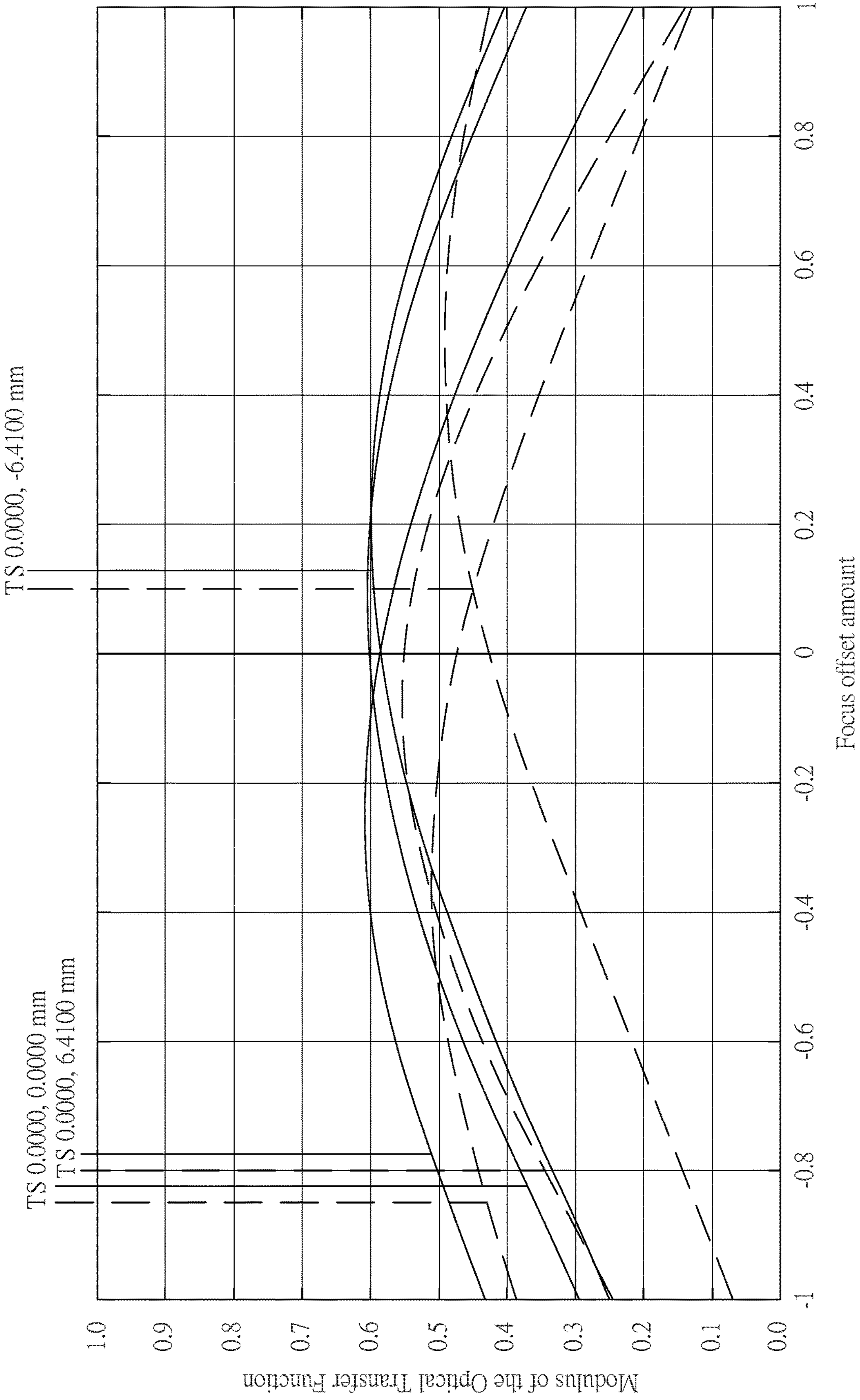
FIG. 5 is a diagram illustrating the Modulation Transfer Function (MTF) of the lens shown in FIG. 1 according to an embodiment of the present invention.
Figure 6:
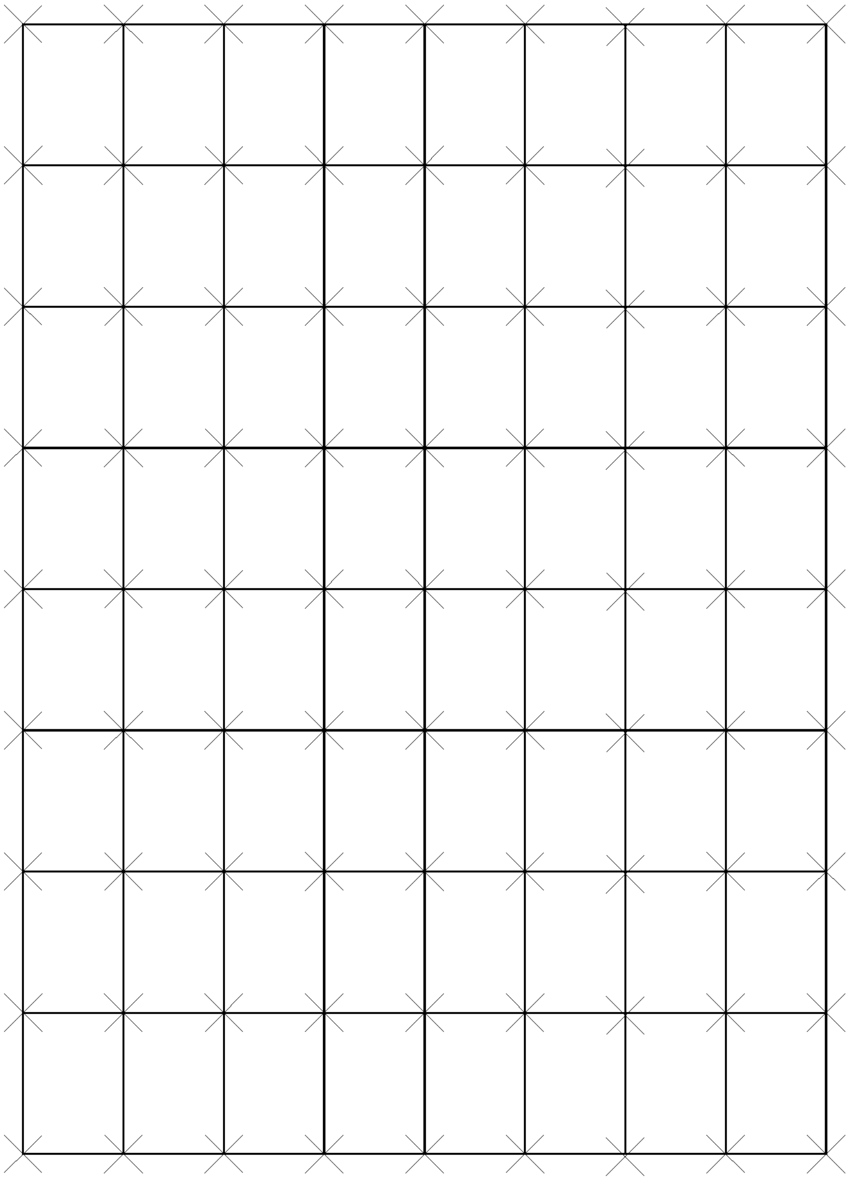
FIG. 6 is a diagram illustrating the grid distortion of the lens shown in FIG. 1 according to an embodiment of the present invention.
Figure 7:
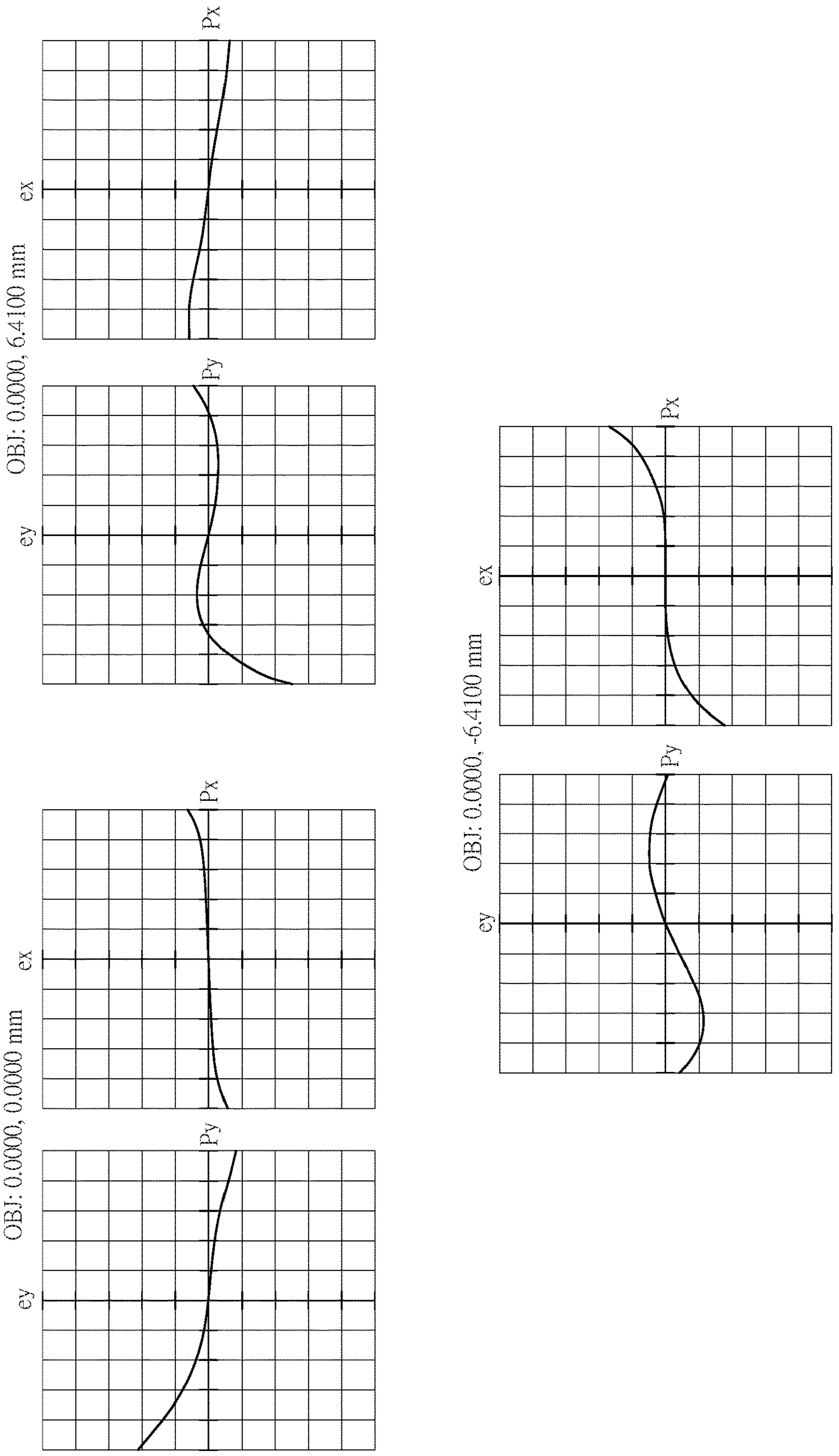
FIG. 7 is a diagram illustrating the ray fan of the lens shown in FIG. 1 according to an embodiment of the present invention.

FIG. 5 is a diagram illustrating the Modulation Transfer Function (MTF) of the lens shown in FIG. 1 according to an embodiment of the present invention. FIG. 6 is a diagram illustrating the grid distortion of the lens shown in FIG. 1 according to an embodiment of the present invention. FIG. 7 is a diagram illustrating the ray fan of the lens shown in FIG. 1 according to an embodiment of the present invention. As shown in FIG. 5 to FIG. 7, the good performance of the lens 10 in this embodiment yields good imaging quality.

Figure 8:
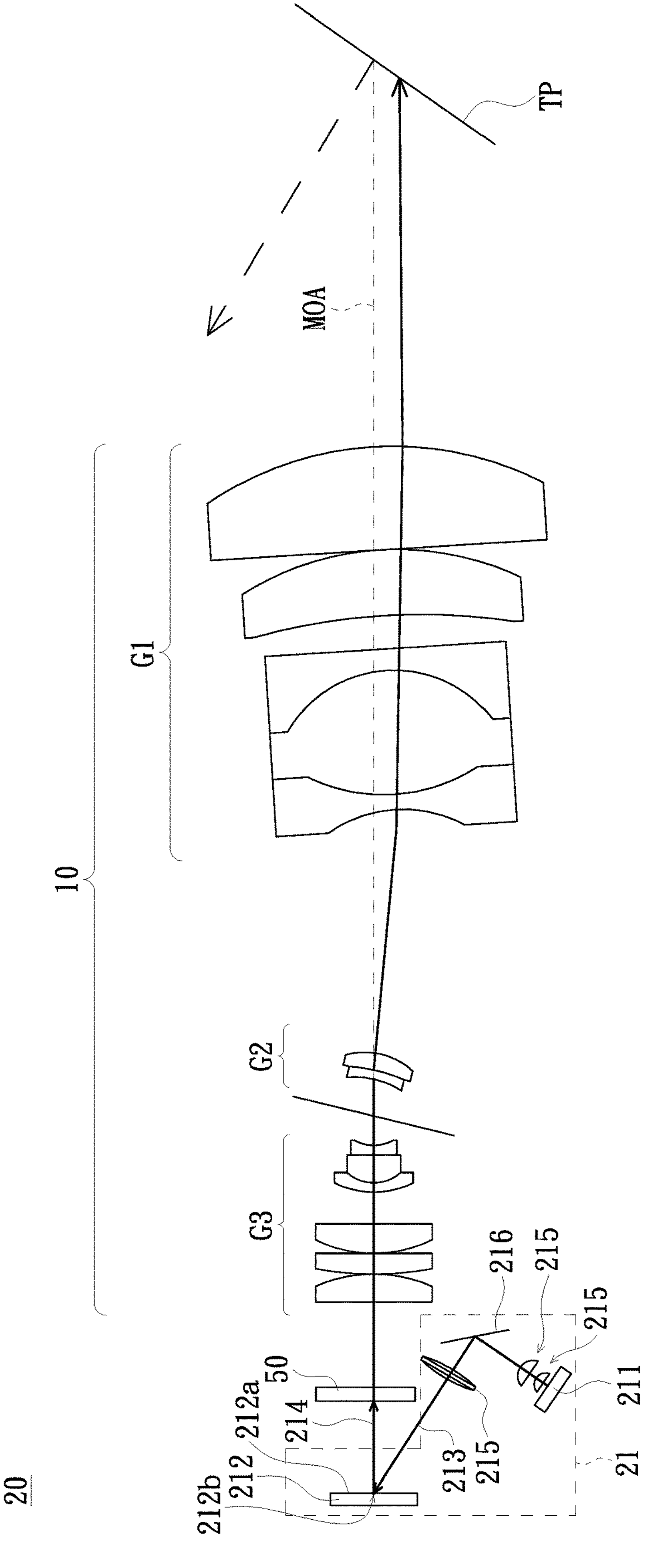
FIG. 8 is a diagram illustrating the structured light of the lens shown in FIG. 1 according to an embodiment of the present invention.

FIG. 8 is a diagram illustrating the structured light of the lens shown in FIG. 1 according to an embodiment of the present invention. Referring to FIG. 8, the structured light projection device 20 of this embodiment comprises a structured light illumination system 21 and the above-mentioned lens 10. The structured light illumination system 21 comprises a light source 211 and a light valve 212. The light source 211 is adapted to provide an illumination beam 213, and the light valve 212 is adapted to convert the illumination beam 213 into a structured beam 214. The light valve 212 is located on the reduction side of the lens 10, and the lens 10 is adapted to project the structured beam 214 to the target surface TP located on the enlargement side of the lens 10. The primary optical axis MOA of the lens 10 is overlapped with the normal vector of the center 212*b* of the active surface 212*a* of the light valve 212. The light source 211 may be an LED light source, but the present invention is not limited thereto. The light valve 212 can be a digital micromirror device (DMD), a liquid crystal on silicon (LCoS) element, or other types of light valves. In an embodiment, the digital micromirror element may be a Tilt & Roll Pixel (TRP) DMD. The structured light illumination system 21 may further include other optical elements disposed between the light source 211 and the light valve 212, such as a lens 215 and a reflection element 216.

Since the structured light projection device 20 of this embodiment adopts the above-mentioned lens 10, when the structured beam 214 is projected on the inclined target surface TP, the keystone distortion of the projected images can be avoided by rotating the first lens group G1 and the second lens group G2 and/or moving the first lens group G1.

In an embodiment, the above-mentioned structured light projection device 20 may further comprise an optical low pass filter (LPF) 50 arranged between the light valve 212 and the third lens group G3. The optical LPF 50 may comprise birefringent material, wherein the birefringent material may include quartz material and a wavelength retarder. After the structured beam 214 passes through the optical low pass filter 50, it will have a specific target frequency to reach the goal of reducing or eliminating interference.

Figure 9:
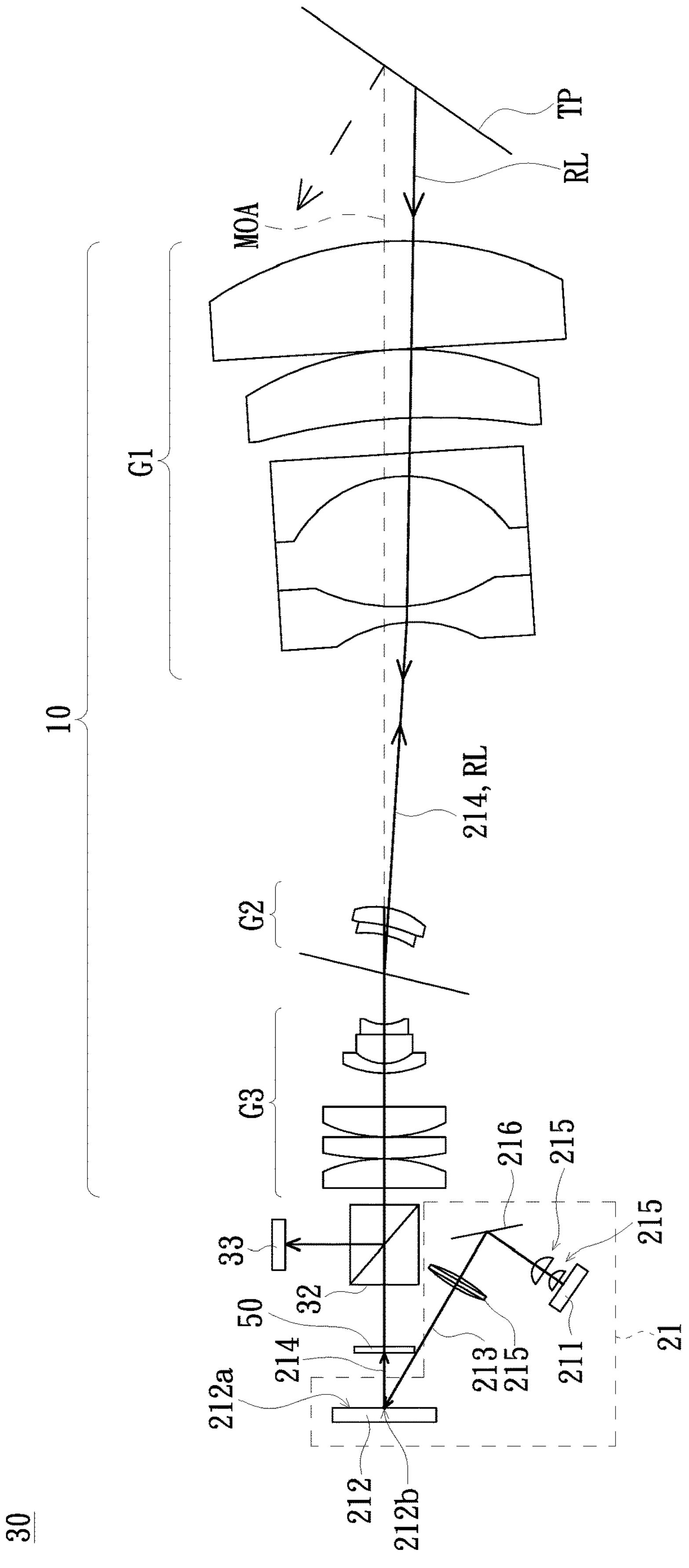
FIG. 9 is a diagram illustrating a 3D measuring device according to an embodiment of the present invention.

FIG. 9 is a diagram illustrating a 3D measuring device according to an embodiment of the present invention. The 3D measuring device 30 in this embodiment comprises the above-mentioned structured light illumination system 21, a beam-splitter 32, an image sensor 33, and the above-mentioned lens 10. The beam-splitter 32 is arranged between the light valve 212 and the third lens group G3, and the beam-splitter 32 is adapted to make the structured beam 214 pass through to the lens 10. The image sensor 33 is arranged adjacent to the beam-splitter 32, wherein the reflection beam RL reflected from the target surface TP passes through the lens 10 and is reflected in the image sensor 33 by the beam-splitter 32. As shown in FIG. 9, the solid arrow from the light valve 212 to the direction of the target surface TP indicates the light path of the structured beam 214, and the solid arrow from the target surface TP to the light valve 212 direction indicates the light path of the reflection beam RL. The structured beam 214 and the reflection beam RL are represented by the same light path between the beam-splitter 32 and the target surface TP. The image sensor 33 may be a charge-coupled device (CCD) or a complementary metal-oxide semiconductor (CMOS) image sensor, but the present invention is not limited thereto. In this embodiment, between the beam-splitter 32 and the target surface TP, the image sensor 33 and the light valve 212 may be a coaxial system.

The beam-splitter 32 may be an element that partially allows light to pass through and partially reflects light, such as a beam splitter (BS) prism, R40/T60 (i.e., the reflectivity being 40%, and the transmittance being 60%) or R50/T50 may be selected according to different applications. In other embodiment, the beam-splitter 32 may also be implemented as a polarized beam-splitter, while the image sensor 33 is equipped with filters with four different polarization directions (i.e., 0 degrees, 45 degrees, 90 degrees, 135 degrees) to receive polarized light.

Since the 3D measuring device 30 in this embodiment adopts the above-mentioned lens 10, when the normal vector of the target surface TP is inclined relative to the primary optical axis MOA, the first lens group G1 and the second lens group G2 can be rotated and/or the first lens can be moved, to avoid the keystone distortion of the projected image of the structured beam 214 on the target surface TP, and avoid making the image sensor 33 senses obvious field curvature of the image of the target surface TP, thus solving the issue that the blurring occurs in local areas encountered in related art techniques. Therefore, the 3D measuring device 30 in this embodiment may improve the accuracy of 3D measurement.

Similar to the embodiment of FIG. 8, the 3D measuring device 30 of the embodiment of FIG. 9 may further comprise an optical low pass filter 50 arranged between the light valve 212 and the beam-splitter 32. Note that in the embodiment of FIG. 9, the location of the structured light illumination system 21 and the location of the image sensor 33 are interchangeable, rather than being limited to what is shown in the figure.

Figure 10:
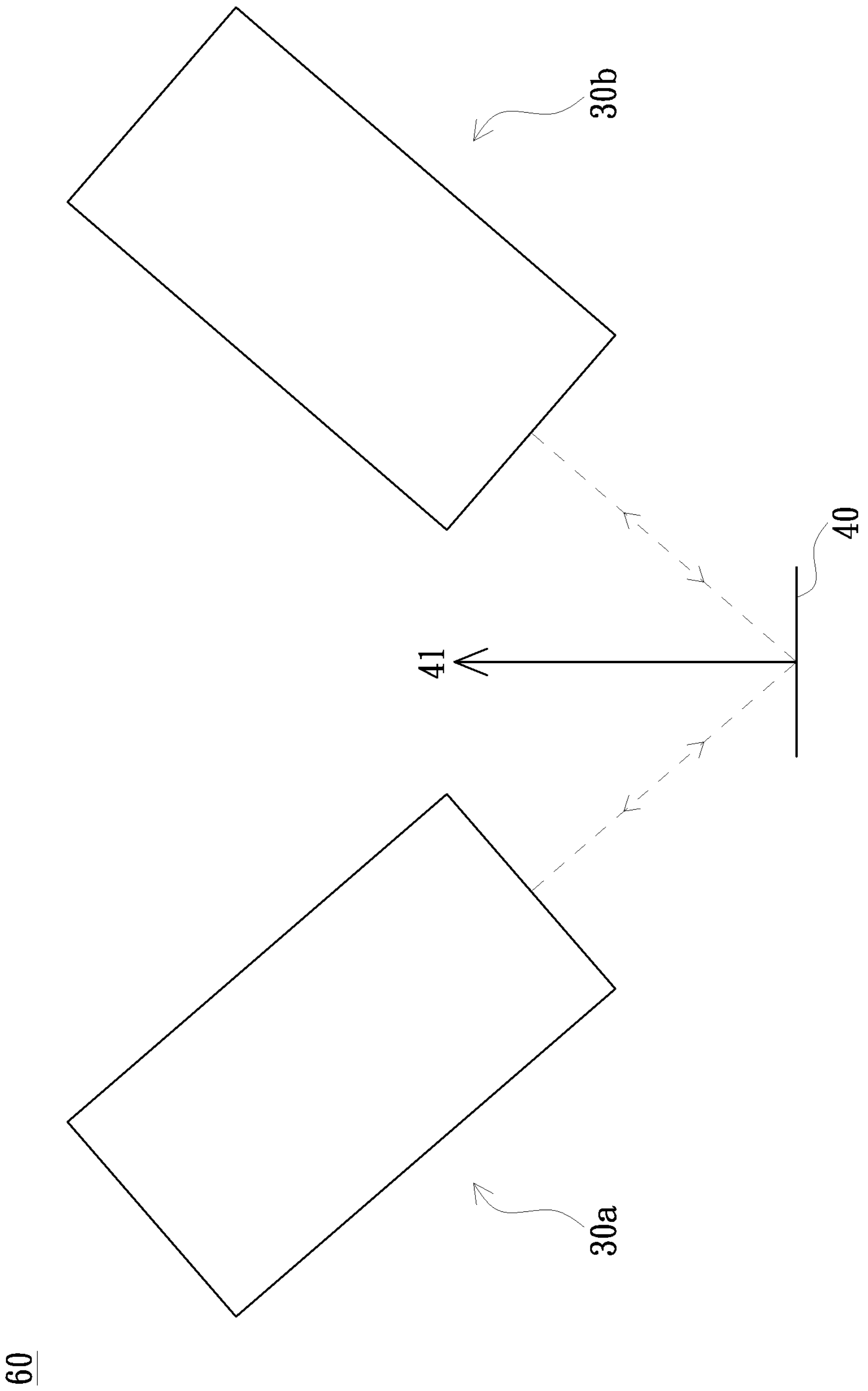
FIG. 10 is a diagram illustrating a 3D measuring device according to another embodiment of the present invention.

FIG. 10 is a diagram illustrating a 3D measuring device according to another embodiment of the present invention. Referring to FIG. 10, in this embodiment, the 3D measuring device 60 comprises two 3D measuring devices 30*a* and 30*b*, wherein the 3D measuring devices 30*a* and 30*b* are the same as the 3D measuring device 30 shown in FIG. 9, and thus some similar/identical details will not be repeated here. In this embodiment, the primary optical axis MOA of the 3D measuring devices 30*a* and 30*b* incline towards different directions (e.g., 35 degrees) concerning the normal 41 of the target surface TP.

Since the 3D measuring device 60 of this embodiment adopts two 3D measuring devices 30*a* and 30*b*, when sensing the target surface TP, it is possible to mutually compensate to eliminate noise points and reconstruct complete image data of the target object more accurately. In addition, in another embodiment, another 3D measuring device may be added on the normal 41 of the target surface TP to further improve the accuracy of the reconstructed image data.

Given the above, concerning the lens of the present embodiment of the invention, since the first lens group and the second lens group are adapted to rotate in opposite directions and the first lens group is also adapted to move, the problem of image distortion can be improved by moving and rotating. The structured light projection device of the present invention uses the above-mentioned lens, and thus it can eliminate the problem of keystone distortion in projected images. Further, the 3D measuring device of the present invention uses the above-mentioned lens, to improve the problem of keystone distortion in the projected images and the field curvature phenomenon in the sensed images, thereby improving the accuracy of 3D measurement.

Although the present invention is disclosed as the embodiments as described above, those embodiments are not meant to limit the scope of the present invention. As those skilled in the art to which the present invention belongs may make some changes without departing from the spirit and scope of the present invention, the claimed scope of the present invention shall be determined according to the following claims.

What is claimed is:

1. A lens comprising a first lens group, a second lens group, and a third lens group arranged sequentially from an enlargement side to a reduction side, wherein:

the first lens group has a first optical axis, the second lens group has a second optical axis, the third lens group has a third optical axis, and the third optical axis is overlapped with a primary optical axis of the lens;

the first lens group and the second lens group are adapted to rotate in opposite directions so that the first optical axis and the second optical axis are adapted to incline relative to the primary optical axis; and the first lens group is adapted to move towards a first side and a second side of the primary optical axis.

2. The lens according to claim 1, wherein diopters of the first lens group, the second lens group, and the third lens group are all positive.

3. The lens according to claim 1, wherein the first optical axis and the second optical axis incline relative to the primary optical axis, the lens satisfies the following equation:

$$0.85<|\theta 3/(\theta 1-\theta 2)|<2.72;$$

where θ1 denotes an angle between the first optical axis and the primary optical axis, θ2 denotes an angle between the second optical axis and the primary optical axis, and θ3 denotes the angle between the primary optical axis and a normal vector of a target surface located on the enlargement side.

4. The lens according to claim 1, further comprising an aperture stop located in the second lens group, and the primary optical axis passes through the aperture stop.

5. The lens according to claim 4, wherein the aperture stop is located on a side of the second lens group adjacent to the third lens group.

6. The lens according to claim 1, wherein:

the first lens group comprises a first lens, a second lens, a third lens, a fourth lens, and a fifth lens arranged sequentially from the enlargement side to the reduction side, with respective diopters being positive, positive, negative, positive, and negative;

the second lens group comprises a sixth lens and a seventh lens arranged sequentially from the enlargement side to the reduction side, with respective diopters being positive and negative; and the third lens group comprises an eighth lens, a ninth lens, a tenth lens, an eleventh lens, a twelfth lens, and a thirteenth lens arranged sequentially from the enlargement side to the reduction side, with respective diopters being negative, positive, negative, positive, positive, and positive.

7. A structured light projection device, comprising:

a structured light illumination system comprising a light source and a light valve, wherein the light source is adapted to provide an illumination beam, and the light valve is adapted to convert the illumination beam into a structured beam; and a lens comprising a first lens group, a second lens group, and a third lens group arranged sequentially from an enlargement side to a reduction side, wherein the first lens group has a first optical axis, the second lens group has a second optical axis, the third lens group has a third optical axis, and the third optical axis is overlapped with a primary optical axis of the lens; the first lens group and the second lens group are adapted to rotate in opposite directions so that the first optical axis and the second optical axis are adapted to incline relative to the primary optical axis; and the first lens group is adapted to move towards a first side and a second side of the primary optical axis;

wherein the light valve is located on the reduction side of the lens, the lens is adapted to project the structured beam onto a target surface located on the enlargement side of the lens, and the primary optical axis of the lens is overlapped with a normal vector of a center of an active surface of the light valve.

8. The structured light projection device according to claim 7, wherein diopters of the first lens group, the second lens group, and the third lens group are all positive.

9. The structured light projection device according to claim 7, wherein the first optical axis and the second optical axis incline relative to the primary optical axis, the lens satisfies the following equation:

$$0.85<|\theta 3/(\theta 1-\theta 2)|<2.72;$$

where θ1 denotes an angle between the first optical axis and the primary optical axis, θ2 denotes an angle between the second optical axis and the primary optical axis, and θ3 denotes the angle between the primary optical axis and a normal vector of a target surface located on the enlargement side.

10. The structured light projection device according to claim 7, further comprising an aperture stop located in the second lens group, and the primary optical axis passes through the aperture stop.

11. The structured light projection device according to claim 10, wherein the aperture stop is located on a side of the second lens group adjacent to the third lens group.

12. The structured light projection device according to claim 7, wherein:

the first lens group comprises a first lens, a second lens, a third lens, a fourth lens, and a fifth lens arranged sequentially from the enlargement side to the reduction side, with respective diopters being positive, positive, negative, positive, and negative;

the second lens group comprises a sixth lens and a seventh lens arranged sequentially from the enlargement side to the reduction side, with respective diopters being positive and negative; and the third lens group comprises an eighth lens, a ninth lens, a tenth lens, an eleventh lens, a twelfth lens, and a thirteenth lens arranged sequentially from the enlargement side to the reduction side, with respective diopters being negative, positive, negative, positive, positive, and positive.

13. The structured light projection device according to claim 7, further comprises an optical low pass filter, arranged between the light valve and the third lens group.

14. A 3D measuring device, comprising:

a structured light illumination system comprising a light source and a light valve, wherein the light source is adapted to provide an illumination beam, the light valve adapted to convert the illumination beam into a structured beam;

a lens comprising a first lens group, a second lens group, and a third lens group arranged sequentially from an enlargement side to a reduction side, wherein the first lens group has a first optical axis, the second lens group has a second optical axis, the third lens group has a third optical axis, and the third optical axis is overlapped with a primary optical axis of the lens; the first lens group and the second lens group are adapted to rotate in opposite directions so that the first optical axis and the second optical axis are adapted to incline relative to the primary optical axis; the first lens group is adapted to move towards a first side and a second side of the primary optical axis; and the light valve is located on the reduction side of the lens, the lens is adapted to project the structured beam onto a target surface of the enlargement side located on the lens, and the primary optical axis of the lens is overlapped with a normal vector of a center of an active surface of the light valve;

a beam-splitter arranged between the light valve and the third lens group, wherein the structured beam so that the structured beam is transmitted to the lens via the beam-splitter; and an image sensor arranged adjacent to the beam-splitter, wherein after a reflect beam reflected from the target surface passes through the lens, the reflection beam is provided to the image sensor via the beam-splitter.

15. The 3D measuring device according to claim 14, wherein diopters of the first lens group, the second lens group, and the third lens group are all positive.

16. The 3D measuring device according to claim 14, wherein the first optical axis and the second optical axis incline relative to the primary optical axis, the lens satisfies the following equation:

$$0.85<|\theta 3/(\theta 1-\theta 2)|<2.72;$$

where θ1 denotes an angle between the first optical axis and the primary optical axis, θ2 denotes an angle between the second optical axis and the primary optical axis, and θ3 denotes the angle between the primary optical axis and a normal vector of a target surface located on the enlargement side.

17. The 3D measuring device according to claim 14, further comprising an aperture stop located in the second lens group, and the primary optical axis passes through the aperture stop.

18. The 3D measuring device according to claim 17, wherein the aperture stop is located on a side of the second lens group adjacent to the third lens group.

19. The 3D measuring device according to claim 14, wherein:

the first lens group comprises a first lens, a second lens, a third lens, a fourth lens, and a fifth lens arranged sequentially from the enlargement side to the reduction side, with respective diopters being positive, positive, negative, positive, and negative;

the second lens group comprises a sixth lens and a seventh lens arranged sequentially from the enlargement side to the reduction side, with respective diopters being positive and negative; and the third lens group comprises an eighth lens, a ninth lens, a tenth lens, an eleventh lens, a twelfth lens, and a thirteenth lens arranged sequentially from the enlargement side to the reduction side, with respective diopters being negative, positive, negative, positive, positive, and positive.

20. The 3D measuring device according to claim 14, further comprising an optical low pass filter arranged between the light valve and the beam-splitter.

* * * * *